US008761190B2

United States Patent
Jiang et al.

(10) Patent No.: US 8,761,190 B2
(45) Date of Patent: *Jun. 24, 2014

(54) MESSAGE LOSS PREVENTION BY USING SENDER AND RECEIVER BUFFERS IN EVENT-TRIGGERED DISTRIBUTED EMBEDDED REAL-TIME SYSTEMS

(75) Inventors: Shengbing Jiang, Rochester Hills, MI (US); Sandeep Menon, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/985,511

(22) Filed: Jan. 6, 2011

(65) Prior Publication Data

US 2012/0177059 A1 Jul. 12, 2012

(51) Int. Cl.
*H04L 12/54* (2013.01)
*H04L 12/28* (2006.01)
*G06F 15/16* (2006.01)

(52) U.S. Cl.
USPC .......................... 370/428; 370/418; 709/232

(58) Field of Classification Search
CPC ........... H04L 2012/40273; H04L 2012/40215; H04L 49/90; H04L 12/40
USPC .......................... 370/412, 428, 230.1; 701/1; 709/230–237
See application file for complete search history.

(56) References Cited

U.S. PATENT DOCUMENTS

| | | | |
|---|---|---|---|
| 6,111,888 A | 8/2000 | Green | |
| 6,879,563 B1 * | 4/2005 | Tomita et al. | 370/246 |
| 7,203,580 B2 * | 4/2007 | Ban et al. | 701/29.1 |
| 7,711,461 B2 * | 5/2010 | Yokogawa | 701/33.4 |
| 8,095,264 B2 * | 1/2012 | Tanigawa et al. | 701/32.7 |
| 2003/0200344 A1 * | 10/2003 | Fukushima | 709/251 |
| 2006/0259231 A1 * | 11/2006 | Ichikawa et al. | 701/115 |
| 2007/0021847 A1 * | 1/2007 | Hyodo et al. | 700/20 |
| 2008/0137679 A1 | 6/2008 | Horst | |
| 2009/0282179 A1 * | 11/2009 | Patzelt et al. | 710/262 |
| 2010/0042290 A1 * | 2/2010 | Isoyama | 701/35 |
| 2010/0162090 A1 * | 6/2010 | Emde et al. | 714/807 |
| 2010/0220735 A1 * | 9/2010 | Vermunt et al. | 370/401 |
| 2010/0329272 A1 * | 12/2010 | Tsuboi et al. | 370/401 |
| 2011/0131666 A1 * | 6/2011 | Tanaka | 726/30 |

\* cited by examiner

*Primary Examiner* — Ayaz Sheikh
*Assistant Examiner* — Hoang-Chuong Vu

(57) ABSTRACT

A vehicular distributed embedded real-time controller area network system includes ECUs functioning in an event-triggered mode for initiating transmission of a message to a communication bus. Each ECU includes a sending buffer for storing message. A bus controller interfaces with the ECUs and manages the transfer of messages to and from the communication bus. The transfer of messages onto the communication bus is executed by the bus controller on a periodic basis. The bus controller is unavailable to receive a message from an ECU when a previous message stored within a memory of the bus controller is awaiting transmission on the communication bus. The bus controller is available to receive a message from an ECU when the memory is empty. Messages are stored in the sender buffer when the bus controller is unavailable. A respective message within the sender buffer is transferred to the bus controller when the bus controller is available.

20 Claims, 4 Drawing Sheets

MESSAGE LOSS PREVENTION BY USING SENDER AND RECEIVER BUFFERS IN EVENT-TRIGGERED DISTRIBUTED EMBEDDED REAL-TIME SYSTEMS

BACKGROUND OF INVENTION

An embodiment relates generally to controller area network systems within a vehicle.

A controller-area network (CAN) is a vehicle bus standard intended to allow electronic control units (ECUs) and other devices to communicate with one another without a central or host computer. Vehicle systems and subsystems have numerous ECUs that control actuators or receive vehicle operation data from sensing devices. The CAN system is an asynchronous broadcast serial bus which communicates messages serially. Therefore, only one message is communicated on a communication-bus at one instance of time. When a message is ready to be transmitted onto the communication bus, the bus controller controls the message transfer on the bus. If more than one message transmission is initiated simultaneously by multiple transmitters, the more dominant message is transmitted. This is known as an arbitration process. A message with a highest priority will dominate the arbitration and a message transmitting at the lower priority will sense this and wait.

In various scenarios, messages relating to vehicle operation may be processed by different nodes in succession within a CAN system. In such a scenario, the messages are provided to a first node and the messages are processed at different instances of time. When the processing for a first message is completed at a respective node, it is transmitted along the communication bus to a next node for additional processing. Meanwhile, the next message is processed in the first node, and is thereafter successively transmitted along the communication bus to the next node for additional processing. This process continues for successive messages. Due to inherent delays in processing messages, or contention in the communication bus, messages may be lost in the communication process since there is no central or host computer to assure that each of the messages are maintained and not dropped. In such an instance, the lost message may be overwritten by another message. Therefore, there is a need to assure that each message that may be lost to due to jitter, asynchronous clocks, and finite bus controller buffer sizes, are properly maintained and processed within the CAN system.

SUMMARY OF INVENTION

An advantage of an embodiment is the reduction of message loss due to contention on the communication bus in a CAN system. Sender buffers are added in each node that store messages that are generated for transmission, but cannot be transferred to the bus controller due to the current message already occupying the memory of the bus controller. Receiving buffers are added in each node for storing message received from the communication bus where application components within a node for which the message is directed is not available to receive and process the received message. Therefore, messages that are delayed in transmission in the CAN system due to jitter, finite CAN controller buffer size, and asynchronous clocks can be stored in a buffer until the bus controller is available or the application component is ready to process the message.

An embodiment contemplates a distributed embedded real-time controller area network system for a vehicle. A communication bus transmits messages within the controller area network system. A plurality of nodes forms a plurality of communication endpoints that are communicably coupled by the communication bus. Each node comprises at least one application component for generating vehicle operation data and an electronic control unit that is in communication with the at least one application component. The electronic control unit generates a message containing the vehicle operation data. The electronic control unit functions in an event-triggered mode to initiate a transmission of the message to the communication bus. The electronic control unit includes a sending buffer for storing the generated message. A bus controller interfaces with the electronic control unit. The bus controller manages the transfer of messages to and from the communication bus. The transfer of messages onto the communication bus is executed by the bus controller on a periodic basis. The bus controller is unavailable to receive a message from the electronic control unit when a previous message stored within a memory of the bus controller is awaiting transmission on the communication bus. The bus controller is available to receive a message from the electronic control unit when the memory is empty. Messages are stored in the sender buffer when the bus controller is unavailable. A respective message within the sender buffer is transferred to the bus controller when the bus controller is available.

An embodiment contemplates a method of communicating messages between nodes within a distributed embedded real-time controller area network system of a vehicle. The controller area network system includes a communication bus and a bus controller for controlling a transmission of messages on the communication bus where the transfer of messages onto the communication bus is executed by the bus controller on a periodic basis. The controller area network system further includes a plurality of nodes forming a plurality of communication endpoints that are communicably coupled by the communication bus. Each node includes at least one application component, an electronic control unit, a sender buffer, and a receiver buffer. The method comprises the steps of the electronic control unit receiving vehicle operation data from the at least one application component and generating a message that includes the vehicle operation data for transmission on the communication bus. The electronic control unit functioning in an event-triggered mode for initiating the transmission of the message on the communication bus to a next respective mode. The message is stored in the sender buffer in response to the bus controller indicating that the communication bus is unavailable. A respective message is transferred from the sender buffer when the bus controller is available to receive a next message. The bus controller is unavailable to receive the next message from the electronic control unit when a previous message stored within a memory of the bus controller is awaiting transmission on the communication bus. The bus controller is available to receive a message from the electronic control unit when the memory is empty. The respective message is transmitted on the communication bus.

DETAILED DESCRIPTION

Figure 1:
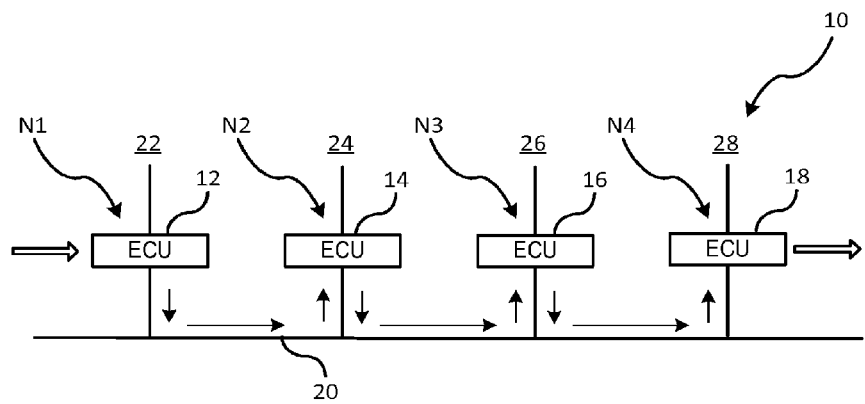
FIG. 1 is a schematic illustration of a controller area network system.

There is shown in FIG. 1 a controller area network (CAN) system 10. The CAN system 10 includes a plurality of electronic control units (ECUs) 12-18 coupled to a communication bus 20 which allows the ECUs to communicate with one another. Each of the plurality of ECUs 12-18 are coupled to one or more sensors, actuators, or control devices (the group hereinafter referred to as application components) and are generally represented by 20-26, respectively. The application components are not directly connected to the communication bus 20, but are coupled through the respective ECUs. The application components could also be software components in ECUs. A single control feature may span across multiple application components, and involve control messages from source to destination ECU via one or more intermediate processing/control ECUs attached to the same communication bus. For the purposes of this invention, it is understood that CAN systems are known in the art and that ECUs, application devices, CAN controllers, and transceivers are referred to as nodes and the details of their composition will not be discussed in detail herein.

Figure 2:
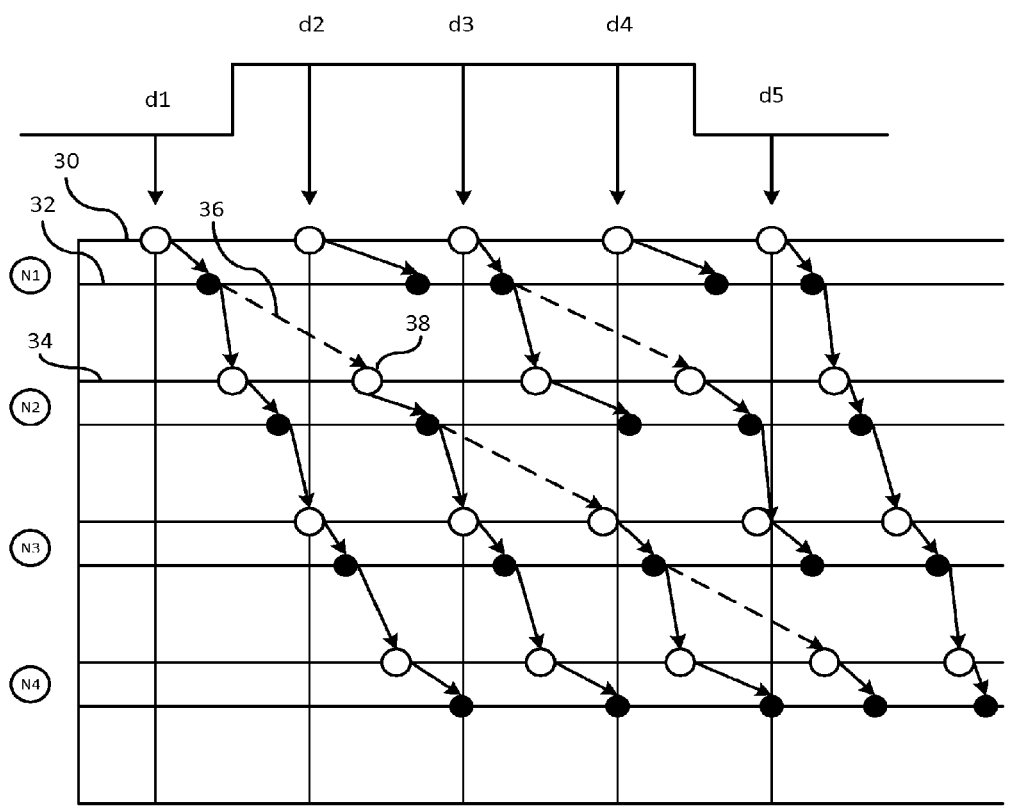
FIG. 2 is a timeline illustrating data message processing in the controller area network system.

In FIG. 1, messages are serially communicated over the communication bus 20 to each ECU 12-18 as shown. Each node N1, N2, N3, and N4 processes each message prior to transmitting each message to a next respective node. The five messages d1-d5 are illustrated in FIG. 2. Messages d1-d5 are each transmitted sequentially to the first node N1. At the first node N1, each message is processed on a periodic basis and then is respectively transmitted to the second node N2 for additional processing. Timeline 30 represents respective times when the messages d1-d5 are input to the first node N1. Timeline 32 represents respective times when the messages d1-d5 are provided to a controller area network controller (hereinafter referred to as a bus controller) for transmission to the second node N2 via the communication bus.

Due to contention on the communication bus, a message may not be immediately added to the bus controller. If contention is present, then the message could be lost.

An example of message loss is illustrated in FIG. 2. The first message d1 is processed in the first node N1 and then is transmitted on the communication bus to the second node N2. Timeline 34 illustrates the time when the message d1 is received at the second node N2. Message d1 is processed in the second node N2 and is then is provided to the bus controller for transmission on the communication bus. The second message d2 is processed in the first node N1 as illustrated on timeline 30.

Message d2 is successfully transmitted on the communication bus and received by the second node N2 as illustrated on timeline 32. Before the arrival of message d2 at node N2, the second execution of the application component on node N2 needs the input, shown at 38, in which case the first message d1 is reused, as shown by the dotted line 36 in FIG. 2. Between the second execution and the third execution of the application component on node N2 on line 34, two input messages d2 and d3 arrive at node N2 as shown on line 32 in FIG. 2. Since the typical buffer size for each node can only accommodate one message, message d2 will be overwritten by message d3 before it could be used by the application component on node N2. As a result, the third execution of the application component on node N2 will use message d3 and message d2 will get lost.

FIG. 2 further shows that messages d3 and d4 are also lost due to message overwritten and message d1 is repeatedly reused. The processed messages output from the fourth node N4 include messages d1-d1-d1-d1-d5. Data messages d2, d3, d4 are lost due message overwritten which may be the direct result of jitter, finite buffers, or asynchronous clocks.

To reduce message loss due to contention at the bus controller or on the communication bus, software based sender buffers and receiver buffers are utilized in each node. CAN Controller hardware contains hardware buffer cells (CAN mailboxes) used for data transmission and receiving. Therefore, the embodiments described herein are directed at a software based buffering strategy without any impacts to the actual CAN Controller hardware buffer usage. A respective ECU within a node will include a sender buffer and a receiver buffer that are shared by all application components on the respective node. For example, for nodes N1-N4 as described in FIG. 2, a common sender buffer and a common receiver buffer is utilized for all application components in N1, a common sender buffer and a common receiver buffer is utilized for all application components in N2, a common sender buffer and a common receiver buffer is utilized for all application components in N3, and a common sender buffer and a common receiver buffer is utilized for all application components in N4.

Figure 3:
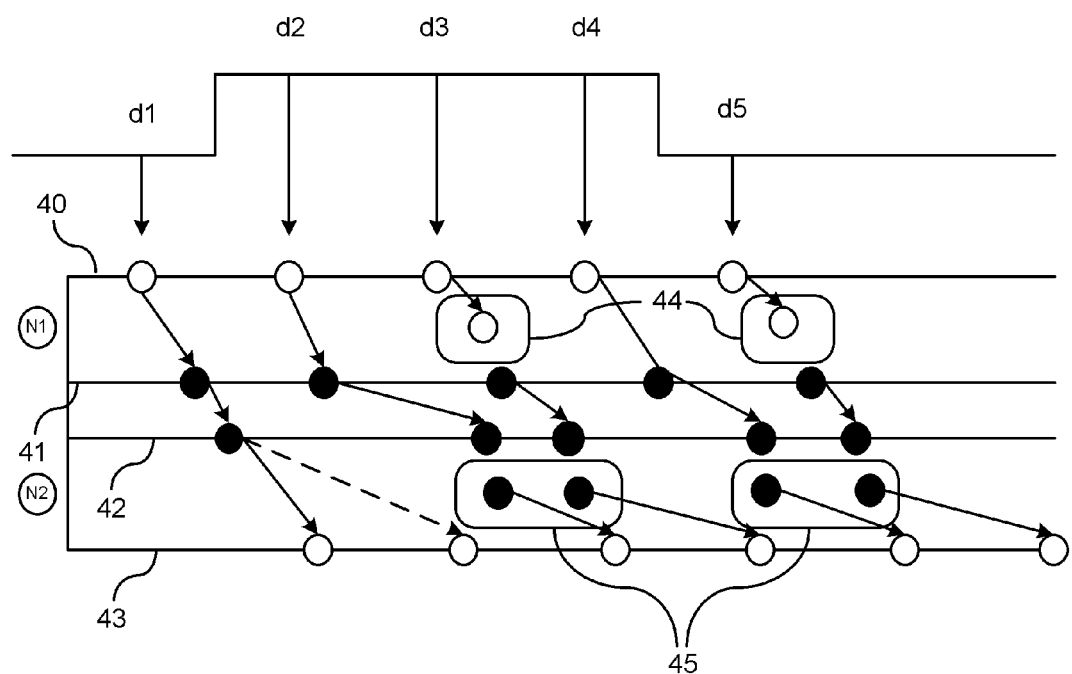
FIG. 3 is a timeline illustrating a buffering technique for the controller area network system.

FIG. 3 illustrates the utilization of a sender buffer and a receiver buffer for preventing message loss. As shown in FIG. 3, messages d1-d5 are transmitted to the first node N1 at periodic instances of time as shown on timeline 40. Timeline 41 represents the time when the messages are transmitted out to the bus controller. Timeline 42 represents the time when the messages are transmitted out on the communication bus. Timeline 43 represents the time when the messages are received by the second node N2.

A sender buffer 44 is integrated within the ECU in the first node N1 and is shared by all application components on the first node N1. The sender buffer 44 temporarily stores messages until the bus controller is ready to accept a next message for transmission on the communication bus.

A receiver buffer 45 is integrated within the ECU in the second node N2 and is shared by all application components on the second node N2. The receiver buffer 45 temporarily stores messages received on the communication bus until the message is ready to be transferred to an application component.

As illustrated in FIG. 3, all messages are input to the first node N1 at periodic instances of time as shown on timeline 40. In timeline 41, messages may be prevented from being immediately placed in the bus controller due to message rewriting or another message occupying the bus controller. This is illustrated by message d3. Message d2 shown on timeline 40 occupies the memory of the bus controller awaiting transmission on the communication bus. Typically, the bus controller has available memory for only a single message, and if a message such as d2 is already occupying the bus controller, then message d3 cannot be transferred to the bus controller. Under prior art conditions, message d3 would be lost.

In a preferred embodiment as illustrated in FIG. 3, if the bus controller is not ready to accept message d3, then data message d3 is temporarily stored in the sender buffer 44. The message d3 is prioritized in a sender message link list where it waits until the bus controller is available. Various rules may be used to determine how a respective message is prioritized in the message link list as will be discussed in detail later. When the bus controller is empty and message d3 is the highest ordered message in the sender buffer 44, then message d3 is transferred to the bus controller as shown on timeline 41 and is thereafter transmitted on the communication bus as shown on timeline 42.

The receiver buffer 45 is a memory device integrated with an ECU of the second node N2. Application components receive messages from the receiver buffer 45 when the application is ready to process a message. If the application component is unable to accept the message received from the communication bus, then the message may be lost if not retrieved immediately. To reduce message loss, the receiver buffer 45 stores a respective message received in the bus controller until the application component is ready to accept the message. The message stored in the receiver buffer 45 is added to the end of a receiver message link list and awaits message retrieval by a respective application component. As shown in FIG. 3, the receiver buffer 45 is shared by all application components in the second node N2. The receiver buffer 45 may be segregated into buffer cells and each buffer cell is maintained in the receiver message link list according a respective ordering scheme.

The process for buffering messages received from the communication bus is controlled by two software task modules that are used in cooperation with the sender buffer and the receiver buffer. A first task module is an enqueuing task module. The second task module is a dequeuing task module.

For each sender buffer, there is an enqueuing task module and a dequeuing task module. The enqueuing task is executed when the ECU cannot transmit a message to the bus controller due to the memory of the bus controller being occupied. The enqueuing task module provides a routine for adding the message to a respective cell of the sender buffer when the bus controller is unavailable.

The sender buffer includes a plurality of buffer cells. Each buffer cell within the sender buffer is treated as an individual memory block and the messages in different buffer cells are ordered in a sender message link list. The sender message link list prioritizes the order of the buffer cells. The enqueuing task module of the ECU maintains a binary flag for each buffer cell. When a corresponding buffer cell is empty, the binary flag is set to 1. When a corresponding buffer cell is occupied, the binary flag is set to 0.

When the enqueuing task module needs to add a new message to the buffer, a status of the binary flag in each buffer cell is first checked. If the binary flag indicates that there is an empty buffer cell (i.e., binary flag set to 1), then the new message will be entered into the buffer cell and the respective buffer cell is added to the end of the sender message link list. The flag of the respective buffer cell is changed from 1 to 0. In the event that there is no empty buffer cell available, then different deletion policies can be adopted to accommodate the new message such as the oldest message deleted first or the lowest priority message deleted first.

The second software task, the dequeuing task, is used to orderly transfer messages from the sender buffer to the bus controller. The dequeuing task could be triggered by different methods such as periodic triggering, or after the execution of enqueuing task module, or upon the confirmation of the successful transmission of the last message by the bus controller. When the dequeuing task is executed, a message is transferred from the sender buffer to the bus controller. If the transfer is successful, such that the bus controller is available to accept the message, then the message will be transferred and the respective message will be deleted in the sender buffer; otherwise, the message will remain in the sender buffer and the dequeuing task terminates. The dequeuing task will be executed again after the confirmation of the successful transmission of the last message by the bus controller, which indicates that the bus controller currently is available to receive a message. Various dequeuing policies may be used for determining which message in the sender buffer is selected for transfer to the communication controller. Dequeuing policies may include the oldest message transmitted first or highest priority message transmitted first.

For the receiver buffer, there is also an enqueuing task module and a dequeuing task module for transitioning messages from the communication bus to the application components. The enqueuing task module is utilized when a message needs to be retrieved from the communication bus. The enqueuing task module is triggered whenever a new message is received by the bus controller. Each cell of the receiver buffer is treated as an individual memory block and the messages in different buffer cells are organized as a receiver message link list. The enqueuing task module of the ECU maintains a binary empty-flag for each buffer cell (i.e., the binary flag is 1) when the corresponding cell is empty; otherwise the binary flag is 0. When the enqueuing task module needs to add a new message to the receiver buffer, it first checks whether there is an empty buffer cell. If there is an empty buffer cell, then the new message will be stored in the empty buffer cell and the buffer cell is added to the end of the receiver message link list. The binary flag of the buffer cell is changed from 1 to 0. In the event that there is no empty cell currently available in the receiver buffer, then different deletion policies may be adopted such as the oldest message is deleted first or the lowest priority message is deleted first.

The dequeuing task module is utilized for transferring messages from the receiver buffer to a respective application component. The dequeuing task could be triggered by an application component when an input message is needed or may be triggered periodically. Upon a successful removal of the message from the receiver buffer, the message will be removed from the receiver buffer and transferred to the application component or other local storage device associated with the application component. The dequeuing task would always remove the oldest message from the receiver buffer for each application component.

Figure 4:
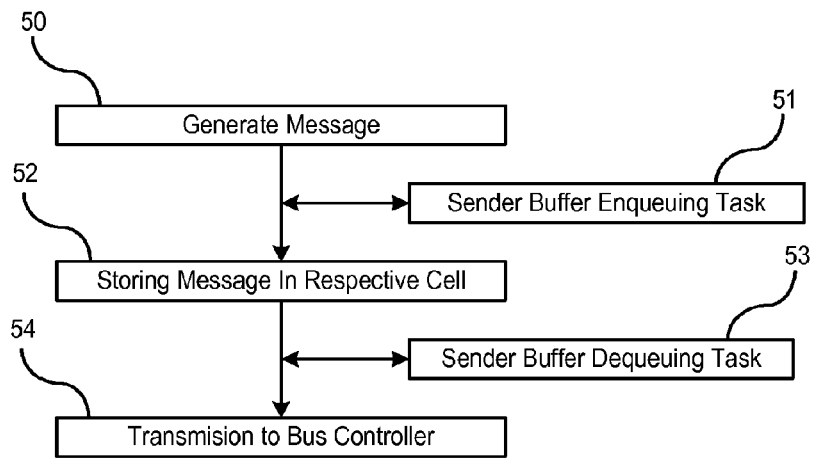
FIG. 4 is a flowchart of a buffering technique for a sender buffer according to an embodiment of the invention.

FIG. 4 illustrates a broad overview of a flow diagram for a sender buffer management technique for transferring messages from an application component of a respective node to the bus controller.

In block 50, the application component processes the data and is transferred to the ECU within the node for generating and transmitting a message on the communication bus. In block 51, the sender buffer enqueuing task is initiated. In block 52, the respective message is stored in a respective cell of the sender buffer. In block 53, the sender buffer dequeuing task is initiated. In block 54, the message is transferred to the bus controller for transmission on the communication bus.

Figure 5:
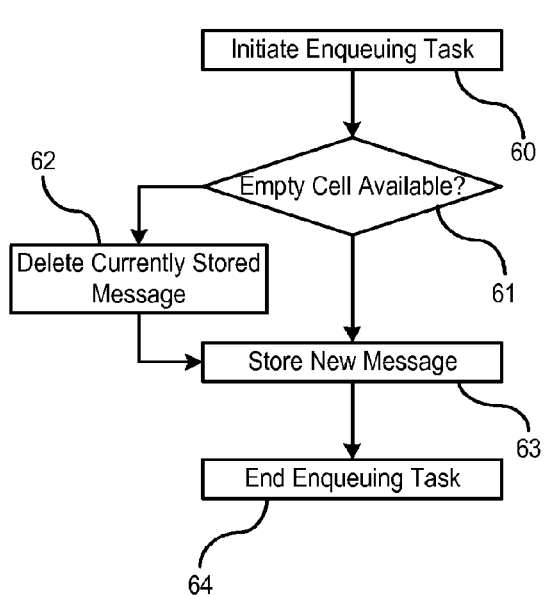
FIG. 5 is a flowchart for an enqueuing task for the sender buffer according to an embodiment of the invention.

FIG. 5 illustrates a detailed process of the sender buffer enqueuing task module initiated as indicated in block 51 of FIG. 4. In block 60, the sender buffer enqueuing algorithm is initiated. In block 61, a determination is made as to whether an empty buffer cell is available in the sender buffer. This determination is based on whether any buffer cell has a binary flag indicating an empty cell status. If the determination is made that a buffer cell is empty, then the routine proceeds to block 63. If the determination is made that an empty buffer cell is not available in the sender buffer, then a currently stored message is deleted in the sender buffer cell, in block 62, according to the deletion policy (e.g., oldest message deleted first or lowest priority message deleted first). In block 63, the new message is stored in the empty buffer cell. The binary flag of the buffer cell is set to 1, and the buffer cell is added to the sender message link list. In block 64, the enqueuing algorithm ends for this respective transfer task.

Figure 6:
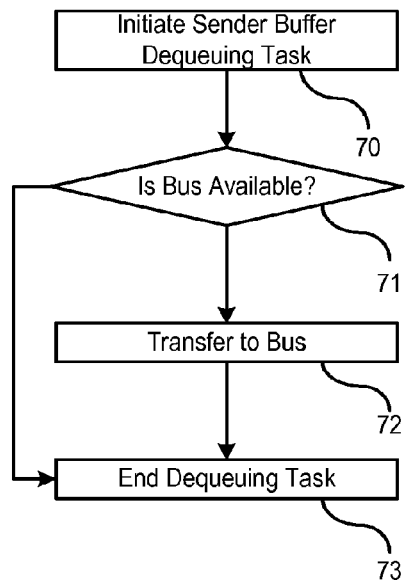
FIG. 6 is a flowchart for a dequeuing task for the sender buffer according to an embodiment of the invention.

FIG. 6 illustrates a detailed process of the sender buffer dequeuing task initiated as indicated in block 53 of FIG. 4. In block 70, the sender buffer dequeuing algorithm is initiated. In block 71, a determination is made as to whether the bus controller is available to accept a message. If the determination is made that the bus controller is not available, then the routine proceeds to block 73. If the determination is made that the bus controller buffer is available to accept a message, then the message is removed from the sender buffer to the bus controller buffer according to the dequeuing process policy in block 72, (e.g., oldest message is dequeued first or highest priority message is dequeued first). In block 73, the dequeuing algorithm ends for the respective transfer task.

Figure 7:
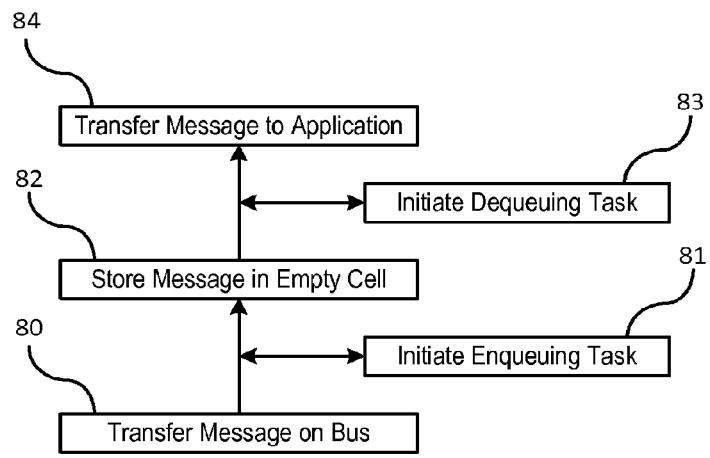
FIG. 7 is a flowchart of a buffering technique for a receiver buffer according to an embodiment of the invention.

FIG. 7 illustrates a broad overview of a flow diagram for a receiver buffer management technique for transferring messages from a bus controller to an application component of a respective node. In block 80, the application bus controller transmits a message on the communication bus and the message is received at a respective node. In block 81, the enqueuing task for the receiver buffer is initiated. In block 82, the respective message is stored in an empty cell of the receiver buffer. In block 83, the receiver buffer dequeuing task is initiated. In block 84, a respective message is transferred to a respective application component.

Figure 8:
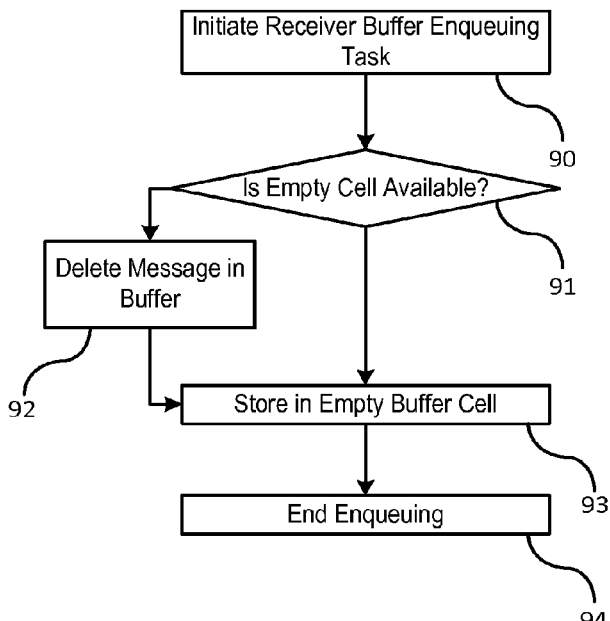
FIG. 8 is a flowchart for an enqueuing task for the receiver buffer according to an embodiment of the invention.

FIG. 8 illustrates a detailed process of the receiver buffer enqueuing task module as indicated in block 81 of FIG. 7. In block 90, the receiver buffer enqueuing algorithm is initiated. In block 91, a determination is made as to whether an empty buffer cell is available in the receiver buffer by determining whether any receiver buffer cell has a binary flag indicating an empty cell status. If the determination is made that a receiver buffer cell has an empty cell status, then the routine proceeds to block 93. If the determination is made that an empty buffer cell is not available in the receiver buffer, then a message is deleted in the receiver buffer cell according to the deletion policy in block 92 (e.g., oldest message deleted first or lowest priority message deleted first). In block 93, the received message is stored in the empty buffer cell. The binary flag of the respective receiver buffer cell is set to 1, and the respective receiver buffer cell is added to the end of the message link list. In block 94, the enqueuing algorithm ends for this respective message task.

Figure 9:
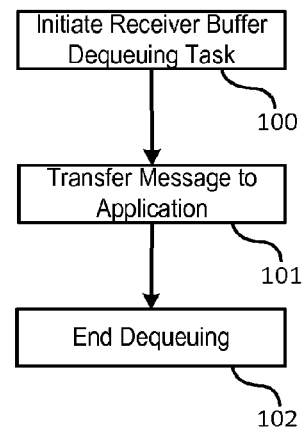
FIG. 9 is a flowchart for a dequeuing task for the receiver buffer according to an embodiment of the invention.

FIG. 9 illustrates a detailed process of the receiver buffer dequeuing task initiated as indicated in block 83 of FIG. 7. In block 100, the receiver buffer dequeuing algorithm is initiated. In block 101, the oldest message stored in the receiver buffer is removed from the receiver buffer and is provided to the respective application component. In block 102, the routine ends for this respective task.

While certain embodiments of the present invention have been described in detail, those familiar with the art to which this invention relates will recognize various alternative designs and embodiments for practicing the invention as defined by the following claims.

What is claimed is:

1. A distributed embedded real-time controller area network system for a vehicle comprising:
 a communication bus for transmitting messages within the controller area network system;
 a plurality of nodes forming a plurality of communication endpoints that are communicably coupled by the communication bus, wherein each node comprises:
  at least one application component for generating vehicle operation data;
  an electronic control unit in communication with the at least one application component, the electronic control unit generating a message containing the vehicle operation data, the electronic control unit functioning in an event-triggered mode to initiate a transmission of the message to the communication bus, the electronic control unit including a sending buffer for storing the generated message; and
 a bus controller that interfaces with the electronic control unit, the bus controller managing a transfer of messages to and from the communication bus, the transfer of messages onto the communication bus being executed by the bus controller on a periodic basis, the bus controller being unavailable to receive a message from the electronic control unit when a previous message stored within a memory of the bus controller is awaiting transmission on the communication bus, and wherein the bus controller is available to receive the message from the electronic control unit when the memory is empty;
 wherein messages are stored in the sender buffer when the bus controller is unavailable, and wherein a respective message within the sender buffer is transferred to the bus controller when the bus controller is available;
 wherein the electronic control unit includes an enqueuing task module that manages a transfer of messages from the at least one application component to the sender buffer, wherein the enqueuing task module determines whether an empty cell is available within the sender buffer, and wherein the message is stored in the empty cell in response to the empty cell being available in the sender buffer; and
 wherein the electronic control unit includes a sender message link list for maintaining a priority ordering of the stored messages within the sender buffer, wherein the enqueuing task module adds the message to the sender message link list.

2. The system of claim 1 wherein the sender buffer is shared by multiple application components within a respective node.

3. The system of claim 1 wherein the enqueuing task module deletes a stored message in the sender buffer in response to an empty cell not being available in the sender buffer, wherein the enqueuing task module adds the message to the sender message link list.

4. The system of claim 3 wherein the enqueuing task module deletes an oldest stored message within the sender buffer in response to an empty cell being unavailable in the sender buffer.

5. The system of claim 3 wherein the enqueuing task module deletes a message with the lowest priority within the sender buffer in response to an empty cell being unavailable in the sender buffer.

6. The system of claim 3 wherein the electronic control unit includes a dequeuing task module that manages a transfer of the message from the sender buffer to the bus controller, wherein the dequeuing task module determines whether the bus controller is available to receive the message, and wherein the dequeuing task module transfers the message queued in the sender message link list of the sender buffer to the bus controller in response to the bus controller memory being available to receive the message.

7. The system of claim 6 wherein the message transferred from the sender buffer to the bus controller is an oldest message in the sender buffer.

8. The system of claim 6 wherein the message transferred from the sender buffer to the bus controller is a message having a highest priority in the sender buffer.

9. The system of claim 1 wherein the electronic control unit includes a receiver buffer for storing messages received on the communication bus when the at least one application component is unavailable, the receiver buffer including a plurality of buffer cells.

10. The system of claim 9 wherein the receiver buffer is shared by multiple application components within a respective node.

11. The system of claim 10 wherein the electronic control unit includes an enqueuing task module that manages a transfer of messages from the bus controller to the receiver buffer, wherein the enqueuing task module determines whether an empty cell is available within the receiver buffer, wherein a received message from the communication bus is stored in the empty cell of the receiver buffer in response to a cell of the receiver buffer being available, and wherein the electronic control unit includes a received message link list for maintaining a priority ordering of the stored messages within the receiver buffer, wherein the enqueuing task module adds the received message to the receiver message link list.

12. The system of claim 11 wherein the enqueuing task module deletes a stored message in the receiver buffer in response to an empty cell not being available in the receiver buffer, wherein the enqueuing task module adds the received message to the available buffer cell.

13. The system of claim 12 wherein the enqueuing task module deletes an oldest stored message within the receiver buffer in response to an empty cell being unavailable in the receiver buffer.

14. The system of claim 12 wherein the enqueuing task module deletes a message having the lowest priority within the receiver buffer in response to an empty cell being unavailable in the receiver buffer.

15. The system of claim 12 wherein a dequeuing task module manages a transfer of a next message from the receiver buffer to the at least one application component, wherein an oldest stored message in the receiver buffer is transferred from the receiver buffer to the at least one application component.

16. A method for communicating messages between nodes within a distributed embedded real-time controller area network system of a vehicle, the controller area network system including a communication bus, a bus controller for controlling a transmission of messages on the communication bus where the transfer of messages onto the communication bus is executed by the bus controller on a periodic basis, the controller area network system further including a plurality of nodes forming a plurality of communication endpoints that are communicably coupled by the communication bus, each node includes at least one application component, an electronic control unit, a sender buffer, and a receiver buffer, the method comprising the steps of:

receiving, by the electronic control unit, vehicle operation data from the at least one application component and generating a message that includes the vehicle operation data for transmission on the communication bus, the electronic control unit functioning in an event-triggered mode for initiating the transmission of the message on the communication bus to a next respective node;

storing the message in the sender buffer in response to the bus controller indicating that the communication bus is unavailable; and transferring a message from the sender buffer when the bus controller is available to receive the message, the bus controller being unavailable to receive the message from the electronic control unit when a previous message stored within a memory of the bus controller is awaiting transmission on the communication bus, and wherein the bus controller is available to receive the message from the electronic control unit when the memory is empty; and transmitting the message on the communication bus;

wherein an encqueuing task module manages a transfer of messages from the at least one application component to the sender buffer, wherein the enqueuing task module determines whether an empty cell is available within the sender buffer, wherein the message is stored in the empty cell in response to the empty cell being available in the sender buffer; and wherein the electronic control unit includes a sender message link list for maintaining a priority ordering of stored messages, wherein the enqueuing task module deletes a stored message in the sender buffer in response to an empty cell not being available in the sender buffer, wherein the enqueuing task module adds the message to the empty cell.

17. The method of claim 16 wherein a dequeuing task module manages a transfer of a next message from the sender buffer to the bus controller, and wherein the dequeuing task module transfers a next message queued in the sender message link list of the sender buffer to the bus controller in response to the bus controller being available to accept the next message.

18. The method of claim 16 further comprising the steps of:
receiving the message in the bus controller from the communication bus;
storing the message received by the bus controller in the receiver buffer; and
transferring the stored message to the at least one application component when the at least one application component is available to receive a next message.

19. The method of claim 18 wherein an enqueuing task module manages a transfer of messages from the communication bus to the receiver buffer, wherein the enqueuing task module deletes a stored message in the receiver buffer in response to an empty cell not being available in the receiver buffer, wherein the enqueuing task module adds the message to the empty buffer cell.

20. The method of claim 19 wherein a dequeuing task module manages a transfer of a next message from the receiver buffer to the at least one application component, wherein an oldest stored message in the receiver buffer is transferred from the receiver buffer to the at least one application component.

* * * * *